(12) United States Patent
Nagpal et al.

(10) Patent No.: US 8,464,090 B2
(45) Date of Patent: Jun. 11, 2013

(54) RECOVERY OF FAILED DISKS IN AN ARRAY OF DISKS

(75) Inventors: Abhinay R. Nagpal, Hadapsar (IN);
Sandeep R. Patil, Elmsford, NY (US);
Sri Ramanathan, Lutz, FL (US);
Matthew B. Trevathan, Kennesaw, GA (US)

(73) Assignee: International Business Machines Corporation, Armonk, NY (US)

( * ) Notice: Subject to any disclaimer, the term of this patent is extended or adjusted under 35 U.S.C. 154(b) by 324 days.

(21) Appl. No.: 12/887,007

(22) Filed: Sep. 21, 2010

(65) Prior Publication Data

US 2012/0072767 A1    Mar. 22, 2012

(51) Int. Cl.
*G06F 11/00*    (2006.01)

(52) U.S. Cl.
USPC ............................................. 714/2; 714/4.11

(58) Field of Classification Search
USPC .................. 714/2, 4.11, 6.1, 6.11, 6.12, 6.13, 714/6.2, 6.21, 6.22, 6.23, 6.24, 6.3, 6.31, 714/6.32
See application file for complete search history.

(56) References Cited

U.S. PATENT DOCUMENTS

| | | | |
|---|---|---|---|
| 6,571,351 B1 | 5/2003 | Mitaru et al. | |
| 7,130,973 B1* | 10/2006 | Chong et al. | 711/162 |
| 7,434,090 B2 | 10/2008 | Hartung et al. | |
| 7,506,187 B2 | 3/2009 | Maddock | |
| 7,587,626 B2 | 9/2009 | Terry et al. | |
| 7,644,304 B2 | 1/2010 | Kotzur et al. | |
| 2003/0051097 A1* | 3/2003 | Ottesen et al. | 711/112 |
| 2007/0011401 A1 | 1/2007 | Zhang et al. | |
| 2007/0088990 A1* | 4/2007 | Schmitz | 714/700 |
| 2008/0250269 A1 | 10/2008 | Cherian et al. | |
| 2009/0044043 A1 | 2/2009 | Cherian et al. | |
| 2010/0050016 A1 | 2/2010 | Franklin et al. | |
| 2010/0079885 A1 | 4/2010 | McKean | |

OTHER PUBLICATIONS

"Zpool (1M)", URL: http://docs.sun.com/app/docs/doc/816-5166/zpool-1m?1=en&n=1&a=view (downloaded May 27, 2010) (18 pages) (2010, copyright Oracle Corporation and/or affiliates).
"Raid Levels", URL: http://www.aspsys.com/content/reference_center/tech_storagest_raid_lv (downloaded May 27, 2010) (11 pages), Aspen Systems Inc.
Weldon et al., "HP Array Technologies", URL: http://www.informit.com/articles/article.aspx?p=359414&seqNum=3 (downloaded May 27, 2010) (14 pages) (Jan. 28, 2005).

* cited by examiner

*Primary Examiner* — Dieu-Minh Le
(74) *Attorney, Agent, or Firm* — Matthew Chung; Roberts Mlotkowski Safran & Cole, P.C.

(57) ABSTRACT

A disk recovery system and method is provided for recovering data from a redundant array of independent (or inexpensive) disks. The method is implemented in a computer infrastructure having computer executable code tangibly embodied on a computer readable storage medium having programming instructions. The computer readable storage medium is operable to: determine input/output (I/O) characteristics of one or more disks in an array; monitor the one or more disks in the array to determine when any of the one or more of the disks have failed in the array; and automatically rebuild the failed disk from a standby pool by nominating a disk in the standby pool based on the I/O characteristics of the one or more failed disks prior to failure.

30 Claims, 6 Drawing Sheets

RECOVERY OF FAILED DISKS IN AN ARRAY OF DISKS

TECHNICAL FIELD

The present invention generally relates to disk recovery systems and more particularly, to a system and method for recovering data from a redundant array of independent (or inexpensive) disks.

BACKGROUND

RAID (redundant array of independent (or inexpensive) disks) provides large disk capacity with very high reliability. This technology is now also referred to generally as "disk array" technology. RAID employs multiple physically separate disks, all accessed through a single array controller which makes the separate drives appear as a single composite drive. Typically the separate disks will be connected through a synchronization cable, so that the spinning platters of all drives are locked into the same rotational phase relative to each other. In different configurations, this approach can be used to achieve higher reliability, faster maximum data rate, and/or shorter maximum access time.

To achieve higher reliability, information is stored so that each disk holds a check or parity byte for the corresponding bytes in the other disks. Thus, if one disk fails, its information can be reconstructed from the information and parity on the other disks. For example, information can be reconstructed to a hot spare or hot standby disk which is used as a failover mechanism to provide reliability in system configurations.

The hot spare is active and connected as part of a working system, and when one disk fails, the hot spare is switched into operation. For example, both hardware and software RAIDs with redundancy may support the use of hot spare drives, e.g., a drive physically installed in the array which is inactive until an active drive fails. In implementation, the RAID system can automatically replace the failed drive with the spare. This reduces the mean time to recovery (MTTR), though it does not eliminate it completely. In fact, subsequent additional failure(s) in the same RAID redundancy group before the array is fully rebuilt can result in loss of the data; rebuilding can take several hours, especially on busy systems.

SUMMARY

In a first aspect of the invention, a method is implemented in a computer infrastructure having computer executable code tangibly embodied on a computer readable storage medium having programming instructions. The computer readable storage medium is operable to: determine input/output (I/O) characteristics of one or more disks in an array; monitor the one or more disks in the array to determine when any of the one or more of the disks have failed in the array; and automatically rebuild the failed disk from a standby pool by nominating a disk in the standby pool based on the I/O characteristics of the one or more failed disks prior to failure.

In another aspect of the invention, a system is implemented in hardware. The system comprises an array controller operable to determine characteristics of one or more failed disks in an array. The array controller operable to automatically rebuild the one or more failed disk from a standby pool by selecting a substitute disk from the standby pool based on the characteristics of the one or more failed disks prior to failure. The rebuilding is performed with ongoing I/O requests running at full speed.

In an additional aspect of the invention, a computer program product comprises a computer usable storage medium having readable program code embodied in the storage medium. The computer program product includes at least one component operable to: monitor one or more disks in an array to determine a failure of any of the one or more of the disks; and automatically substitute the failed disk using a substitute disk from a pool of substitute disks varying technologies, based on matching of I/O characteristics of the one or more failed disks prior to failure.

In a further aspect of the invention, a computer system for substituting a failed disk is provided. The system comprises a CPU, a computer readable memory and a computer readable storage media. The system further comprises first program instructions to determine I/O characteristics of one or more disks in an array by polling each of the one or more disks of the array. The I/O characteristics are READ and ACCESS operations in RANDOM and SEQUENTIAL operations provided as statistics used to decipher READ to WRITE ratio of each of the one or more failed disks in the array. The system further comprises second program instructions to monitor the one or more disks in the array to determine when any of the one or more of the disks have failed in the array. The system further comprises third program instructions to nominate a disk from a pool of disks using a look up table showing efficiencies of different technologies based on the I/O characteristics of one or more failed disks in the array. The system further comprises fourth program instructions to automatically rebuild the failed disk by substituting the failed disk with a substitute disk selected from the pool of disks, based on the I/O characteristics of the one or more failed disks prior to failure, the rebuilding being performed with ongoing I/O requests running at full speed. The system further comprises fifth program instructions to the I/O characteristics are weighted. The first, second, third, fourth and fifth program instructions are stored on the computer readable storage media for execution by the CPU via the computer readable memory.

In yet another aspect of the invention, a method is provided for deploying a system for substituting failed disks in an array. The method comprises providing a computer infrastructure, being operable to: monitor one or more disks in an array to determine a failure of any of the one or more of the disks; and automatically substitute the failed disk using a substitute disk from a pool of substitute disks varying technologies, based on matching of I/O characteristics of the one or more failed disks prior to failure.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

The present invention generally relates to disk recovery systems and more particularly, to systems and methods for recovering data from a redundant array of independent (or inexpensive) disks (RAID) or other storage technologies. More specifically, the present invention provides systems and methods for managing disk failures in a disk array. By implementing the systems and methods of the present invention, "hot spares" can be intelligently pooled on the basis of I/O characteristics, as compared to rebuilding a single disk randomly as is performed in conventional systems. This will increase overall efficiency and performance of computational intensive systems as discussed herein.

More specifically, in embodiments, the systems and methods determine that at least one disk in a disk array has failed, and nominate and substitute the failed disk with another disk of the same type or different type, depending on certain characteristics of data or other criteria of the failed disk. Once the characteristics of data or other criteria of the failed disk is discovered (profiled), the systems and methods of the present invention can substitute the failed disk with a disk that would most efficiently continue operations, based on such characteristics of data or other criteria. For example, a controller (RAID controller) can analyze data of the failed disk including, for example, the amount of READ/WRITE operations performed on the disk prior to its failure, and whether such READ/WRITE operations were SEQUENTIAL or RANDOM. Additional or alternative other criteria may include power efficiency of the disk, heating and cooling requirements, and/or replacement costs, etc. Based on this data, the controller can substitute the failed disk with another disk of the same type or different type that can most efficiently continue operations of the array.

Although the present invention is discussed with reference to disks in an array of disks, one of skill in the art should understand that the present invention should not be limited to only disks. The present invention is equally applicable to any storage technologies such as, for example, flash memory, etc. Accordingly, as used herein, the terminology "disk(s)" should not be considered a limiting feature, and should be interpreted to include any appropriate storage technologies. More specifically, the systems and methods may be implemented with a pool of different disk technologies including, amongst others, solid state disks (SSD), hard disks (HDD), racetrack and Phase Change Memory (PCM). As should be understood by those of skill in the art, certain disk technologies are more efficient than others in performing certain operations and/or under certain conditions. With this said, the systems and methods of the present invention will exchange a failed disk with another disk which can perform the operations of the failed disk most efficiently.

By implementing the systems and methods, many advantages accrue such as, for example, gained improvement in disk (e.g., storage technology) performance, improved usage of available resources, faster access to data, and lower power consumption, to name a few. Moreover, certain industries that have performance intensive systems (e.g., telecommunications, data processing centers, or other computing intensive environments such as, for example, in the financial field, search engine technologies, etc.) will not experience performance degradation during a disk rebuild thus improving overall efficiency. Also, the various embodiments of the present invention allow for a rebuilding process to be performed with a majority of the ongoing I/O requests running at full speed. Moreover, the systems and methods provide disaster prevention by preventing critical data lost during disaster/emergency, which would otherwise have a high negative impact on business functions. For example, the systems and methods of the present invention allow for high data reliability in large-scale IT systems, especially in view of the fact that the size of storage systems in modern, large-scale IT installations has grown to an unprecedented scale with thousands of storage devices making component failures more commonplace.

Figure 1A:
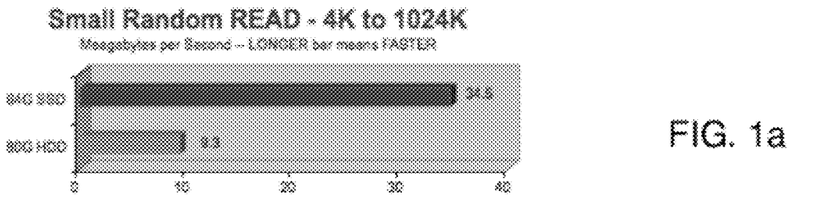
FIGS. 1a-1d show several bar graphs comparing the efficiency of SSD and HDD technologies between small SEQUENTIAL and RANDOM WRITES/READS operations.
Figure 1B:
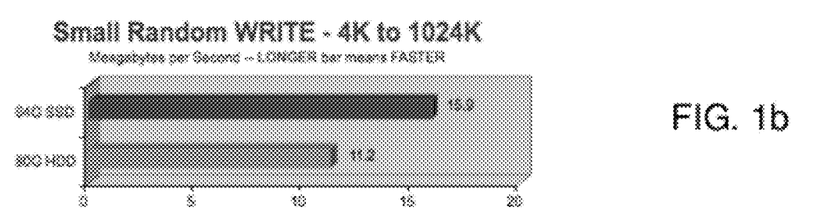
Figure 1C:
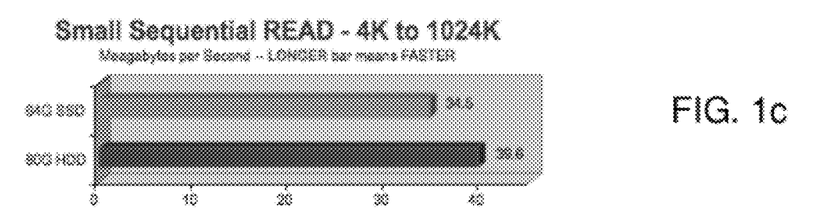
Figure 1D:
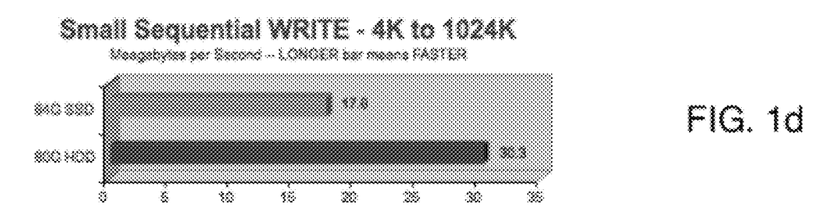

FIGS. 1a-1d show several graphs comparing the efficiency of SSD and HDD technologies between small SEQUENTIAL and RANDOM WRITES/READS operations. For example, in FIG. 1a, a comparison is made between small SEQUENTIAL WRITE (ACCESS) operations between SSD and HDD technologies. As shown, the HDD technology is more efficient as it can write more data in one second than the SSD technology. In FIG. 1b, a comparison is made between small SEQUENTIAL READ operations between SSD and HDD technologies. As shown, the HDD technology is more efficient as it can read more data in one second than the SSD technology. In FIG. 1c, a comparison is made between small RANDOM WRITE (ACCESS) operations between SSD and HDD technologies. As shown, the SSD technology is more efficient as it can write more data in one second than the HDD technology. In FIG. 1d, a comparison is made between small RANDOM READ operations between SSD and HDD technologies. As shown, the SSD technology is more efficient as it can read more data in one second than the HDD technology.

The following table shows a comparison of efficiencies and/or performances of different technologies, including for example, Racetrack, PCM, SSD and HDD. These comparison of efficiencies and/or performances can be used in a look-up table by a computing system, discussed below, for nominating and determining a substitute storage technology for a failed disk. The table compares these technologies with relation to read/write speeds, random/sequential access, power efficiency, heating and cooling efficiency, as well as cost. As should be understood by those of skill in the art any or all of these criteria may be taken into account when substituting a failed disk with a "hot" spare.

TABLE 1

|  | Read Speed | Write Speed | Random Access | Sequential Access | Power Efficiency | Heating Efficiency | Cooling Efficiency | Cost |
| --- | --- | --- | --- | --- | --- | --- | --- | --- |
| Racetrack | 1 (most) | 1 | 1 | 1 | Unknown | Unknown | Unknown | 1 |
| PCM | 2 | 2 | 2 | 2 | 1 | 1 | 1 | 2 |
| SSD | 3 | 4 | 3 | 4 | 2 | 2 | 2 | 3 |
| HDD | 4 (least) | 3 | 4 | 3 | 3 | 3 | 3 | 4 |

By using above table, for example, rapid replacement of failed disks in an array can be accomplished with the most efficient substitute disk for its intended purpose. In this way, the methods and systems can automatically rebuild the failed disk from a standby pool by allocating an entire disk array instead of a single disk thereby maximizing the array performance. By way of two different illustrative, non-limiting examples, the systems and methods can:

automatically rebuild the failed disk from a standby pool by nominating a hot spare SSD if failed HDD disk was involved in READS AND RANDOM ACCESS PATTERNS; and     automatically rebuild the failed disk from a standby pool by nominating a HDD if failed SDD disk was involved in WRITES AND SEQUENTIAL ACCESS PATTERNS.

System Environment

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
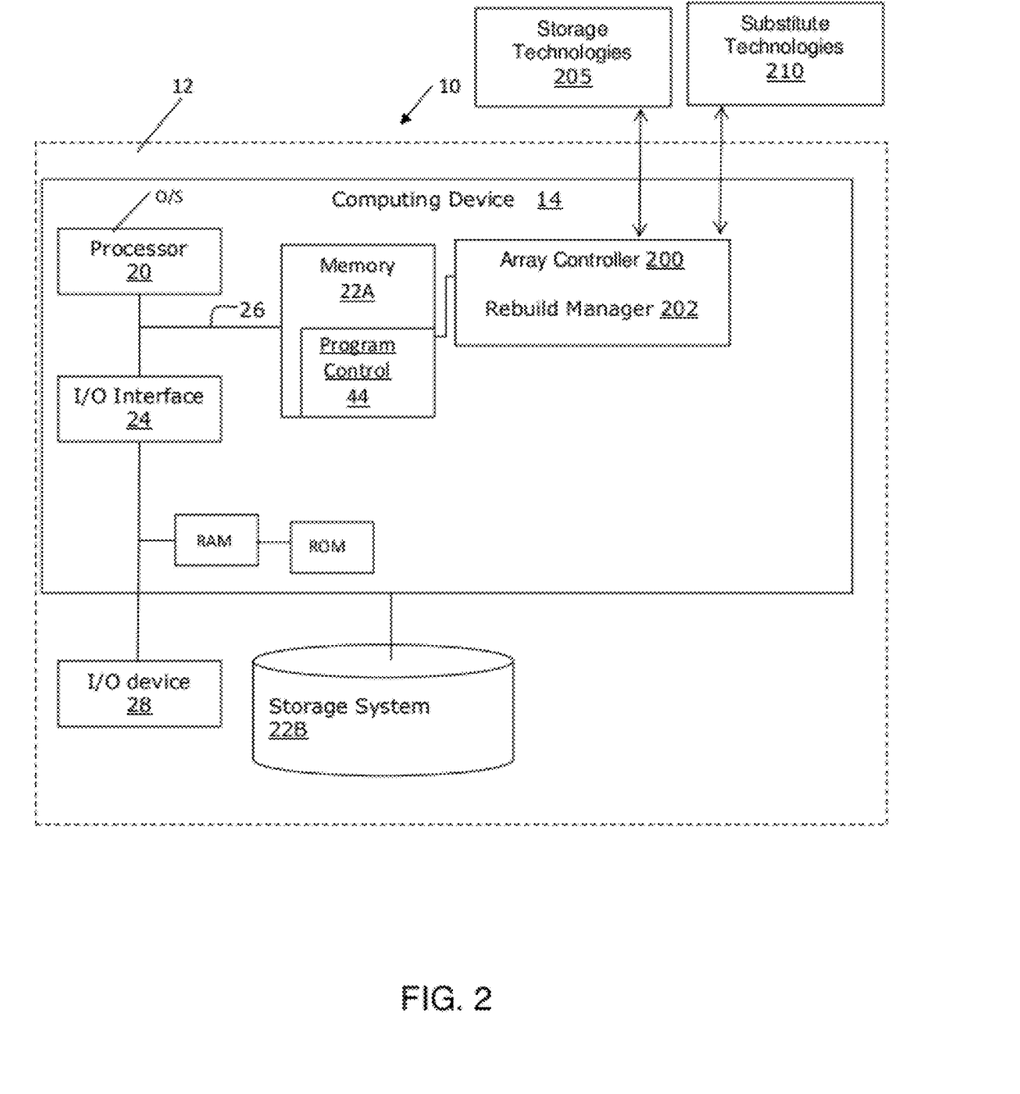
FIG. 2 shows an illustrative environment for implementing the steps in accordance with aspects of the invention.

FIG. 1 shows an illustrative environment 10 for managing the processes in accordance with the invention. To this extent, the environment 10 includes a server or other computing system 12 that can perform the processes described herein. In particular, the server 12 includes a computing device 14. The computing device 14 can be resident on a network infrastructure or computing device of a third party service provider (any of which is generally represented in FIG. 1).

The computing device 14 also includes a processor 20, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (US). The memory (e.g., 22A) may store business intelligence, data mining, regression analysis and/or modeling and simulation tools for execution by the processor 20.

The computing device 14 is in communication with the external I/O device/resource 28 and the storage system 22B. For example, the I/O device 28 can comprise any device that enables an individual to interact with the computing device 14 (e.g., user interface) or any device that enables the computing device 14 to communicate with one or more other computing devices using any type of communications link. The external I/O device/resource 28 may be for example, a handheld device, PDA, handset, keyboard etc.

In general, the processor 20 executes computer program code (e.g., program control 44), which can be stored in the memory 22A and/or storage system 22B. Moreover, in accordance with aspects of the invention, the program control 44 controls an array controller 200, e.g., the processes described herein. The array controller 200 can be implemented as one or more program code in the program control 44 stored in memory 22A as separate or combined modules. Additionally, the controller may be implemented as separate dedicated processors or a single or several processors to provide the function of these tools. While executing the computer program code, the processor 20 can read and/or write data to/from memory 22A, storage system 22B, and/or I/O interface 24. The program code executes the processes of the invention. The bus 26 provides a communications link between each of the components in the computing device 14.

In embodiments, the array controller 200 is operable to monitor operations of different disks (storage technologies) in an array such as, for example, RAID. The disks are generally noted by reference numeral 205. These disks 205 can be, for example, HDD, SSD, Racetrack and PCM, amongst other storage technologies.

In implementations, the array controller 200 can monitor the READ and WRITE operations of each disk of an array 205, to determine if they are RANDOM or SEQUENTIAL operations. The array controller 200 can also determine when a failure occurs to one or more of the disks, and knowing the characteristic operations (I/O) performed by the failed disk, select a substitute disk 210 that would most efficiently be able process the operations previously performed on the failed disk of the array 205. The selection of an appropriate substitute disk can be accomplished by selecting the appropriate disk in a look up table stored, for example, in the storage system 22B. Once selected, the array controller 200 would use the substitute disk 210 to rebuild the failed drive in the array 205.

In embodiments, the array controller 200 can also take into account other factors when making a substitute such as, for example, costs of the substitute disk, heating and cooling requirements, storage capacity of the available substitute disks, statistical rate of failures of the substitute disks, and/or power efficiency, etc. With these factors, the array controller 200 can select the most appropriate disk 210 as a substitute for the failed disk of the array 205. In embodiments, the factors may also be weighted such as, for example, a higher weight can be given to the cost of power consumption compared to heating and cooling requirements. As another example, a higher weight can be provided to the efficiency of the READ/WRITE operations compared to the cost of the substitute disk.

In more specific embodiments, the array controller 200 comprises a rebuild manager 202 for managing rebuild of the disk arrays 205. The rebuild manager 202 is configured to rebuild an entire array 205 of disks comprising a failed disk as compared to rebuilding the single failed disk. The rebuild manager 205 utilizes a plurality of hot spares (substitute disks) 210, which is communicatively coupled to the array controller 200 for use in rebuild operations. In embodiments, the rebuild process can be performed with a majority of the ongoing I/O requests running at full speed. Therefore, databases which access entire array stripes do not experience any performance degradation.

The computing device 14 can comprise any general purpose computing article of manufacture capable of executing computer program code installed thereon (e.g., a personal computer, server, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computing infrastructure 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

Flow Diagram

Figure 3:
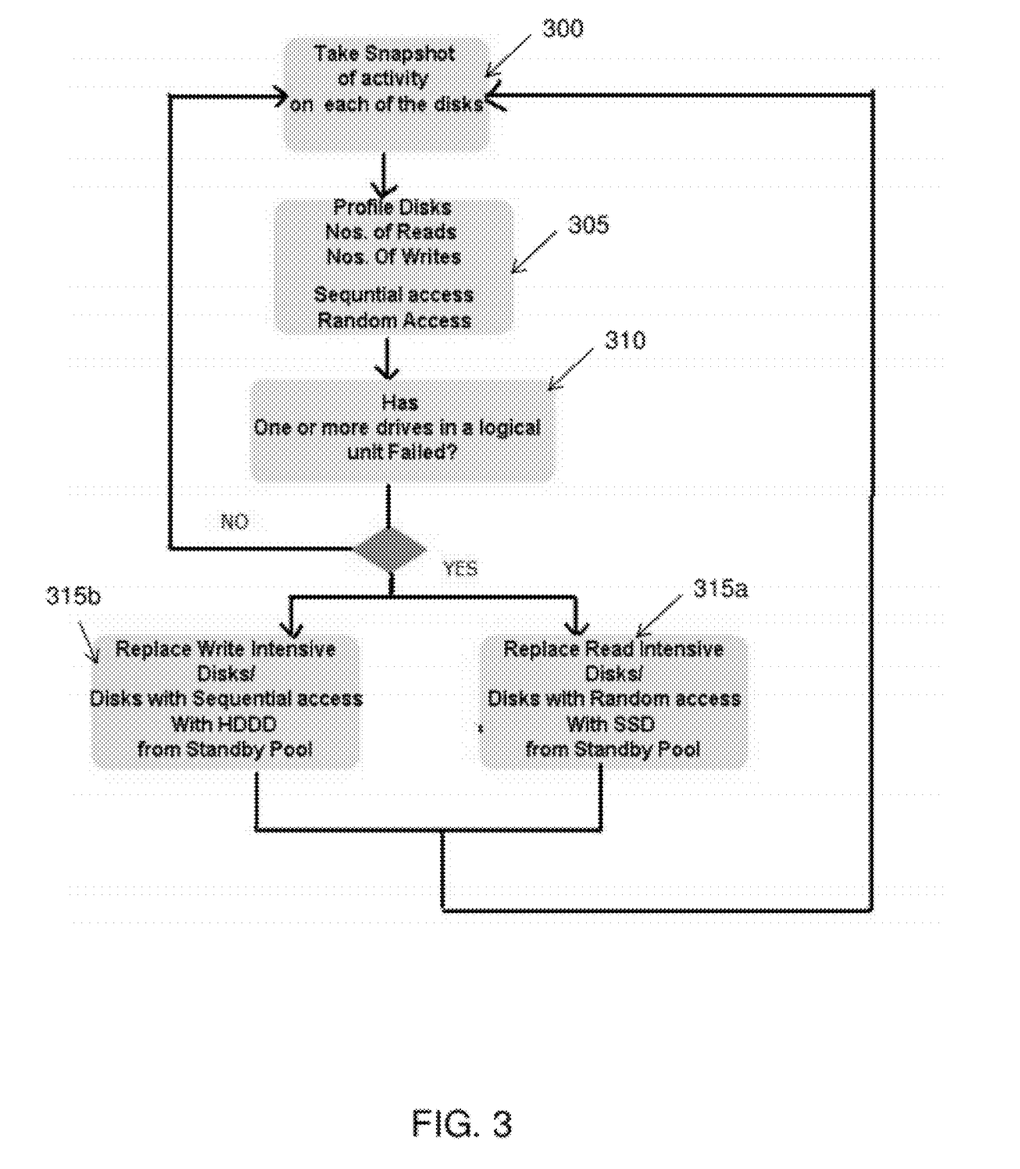
FIG. 3 shows an exemplary flow in accordance with aspects of the invention.
Figure 5:
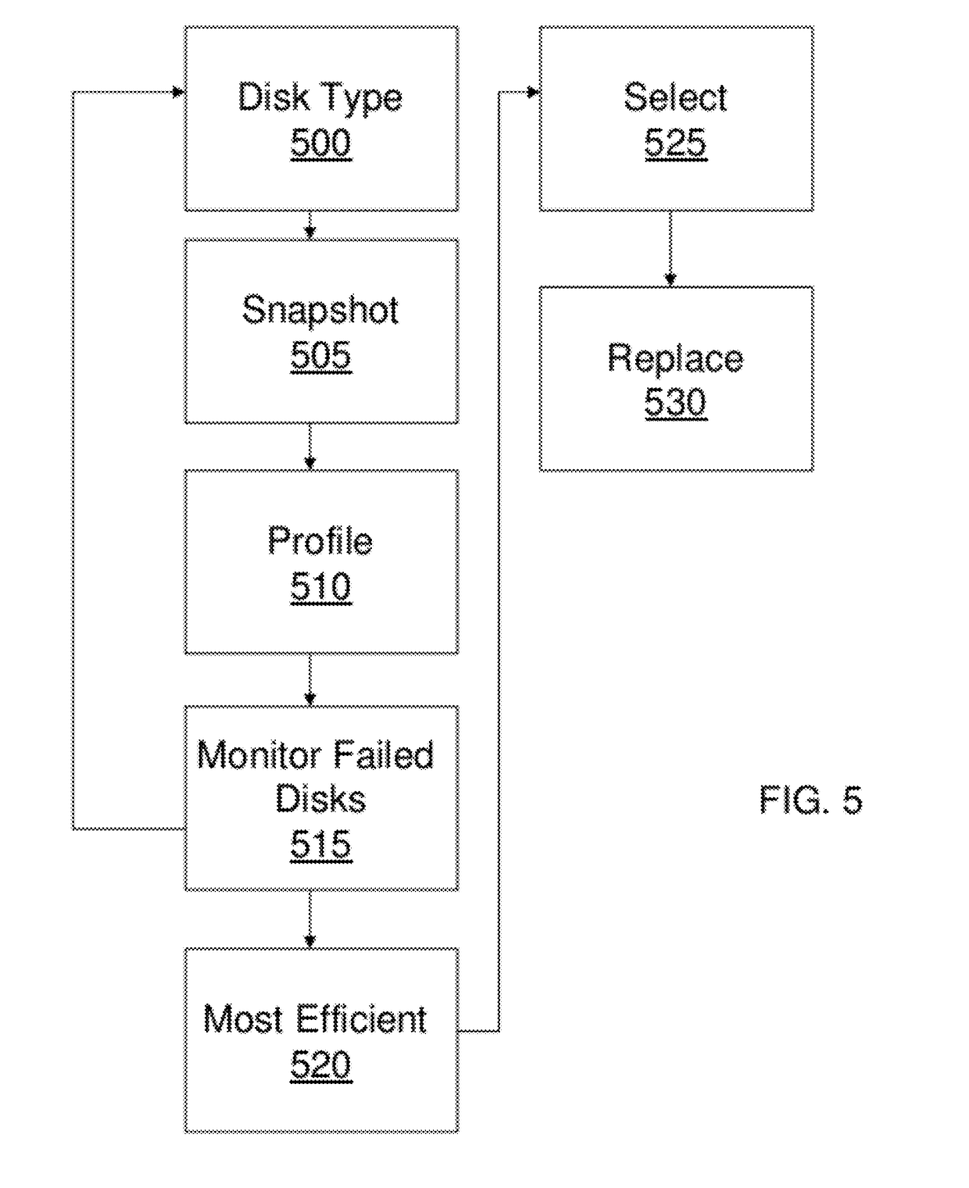
FIGS. 5-6 show additional exemplary flows in accordance with aspects of the invention.
Figure 6:
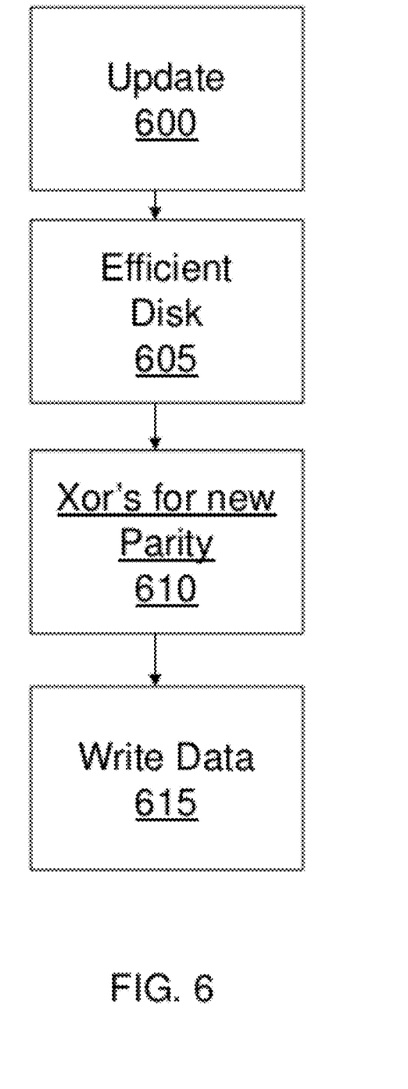

FIGS. 3 and 5-6 show exemplary flows for performing aspects of the present invention. The steps of FIGS. 3 and 5-6 may be implemented in the environment of FIG. 1, for example. The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

FIG. 3 depicts an exemplary flow for a process in accordance with aspects of the present invention. In embodiments, as discussed in more detail below, the array controller comprises a rebuild manager for managing rebuild of the disk arrays. The rebuild manager is configured to rebuild an entire array of disks comprising a failed disk, and utilize a collection of disks communicatively coupled to the array controller for use in rebuild operations. The rebuild process can be performed with a majority of the ongoing I/O requests running at full speed such that database system which accesses entire array stripes do not experience any performance degradation.

More specifically, at step 300, the array controller takes a snapshot of activity of each disk (storage technology) of the array. This may be accomplished by, for example, polling each disk (storage technology) of the array. For example, the following pseudo code can be used to obtain such information:

```
Fetch UDI (Update delete Insert counters)
#!/usr/bin/tclsh
set db_name ""
set wait_time ""
if {([lindex $argv 0] == "") | ([lindex $argv 1] == "") } {
puts "command syntax is : [set argv0]
db_name time_interval_in_seconds"
exit 0
} else {
set db_name [lindex $argv 0]
set wait_time [lindex $argv 1]
puts "DB Name: $db_name , wait time : $wait_time "
}
set output1 [exec db2pd -tcbstat -db $db_name | tr -s " " " " ]
exec sleep $wait_time
set output2 [exec db2pd -tcbstat -db $db_name | tr -s " " " " ]
set counter 1
set row_no 0
set col_no 0
set i 0
foreach value $output1 {
    if { $value == "Stats:"} {
    break
    }
    incr counter 1
}
puts "TableName Scans UDI RTSUDI PgReorgs NoChgUpdts Reads FscrUpdates
Inserts Updates Deletes OvFlReads OvFlCrtes RowsComp RowsUncomp"
puts ""
for { set i [expr $counter + 16]} { $i < [llength $output1] } { incr i 16}
{
    for { set j 0 } { $j < 16 } { incr j } {
        if { ($j == 0 ) } {
    #        puts -nonewline "[lindex $output1 [expr $i + $j ] ]
"
        } else {
            if { ( $j == 1 ) } {
            puts -nonewline "[lindex $output1 [expr $i + $j ] ]
\t\t"
            } else {
            puts -nonewline "[expr ([lindex $output2
[expr $i + $j ] ] - [lindex $output1 [expr $i + $j ] ]) / $wait_time] \t"
            }
        }
    }
```

```
puts ""
#\t [lindex $output1 [expr $i + 2 ] ] \t [expr [lindex $output2 [expr $i +
3 ] ] – [lindex $output1 [expr $i + 3 ] ] \t "
}
```

The output of such exemplary, illustrative code can include the following:

```
DB Name: testdb, wait time : 5
TableName Scans UDI RTSUDI PgReorgs NoChgUpdts Reads
FscrUpdates Inserts Updates Deletes OvFlReads OvFlCrtes
RowsComp RowsUncomp
MAIN_TABLE           0    4038  4038    0   0    0   0
4038   0          0    0    0     0       0
MAIN_TABLE_2         0    5064  5064    0   0    0   0
5064   0          0    0    0     0       0
MAIN_TABLE_3         0    4113  4113    0   0    0   83
4113   0          0    0    0     0       0
```

Figure 4:
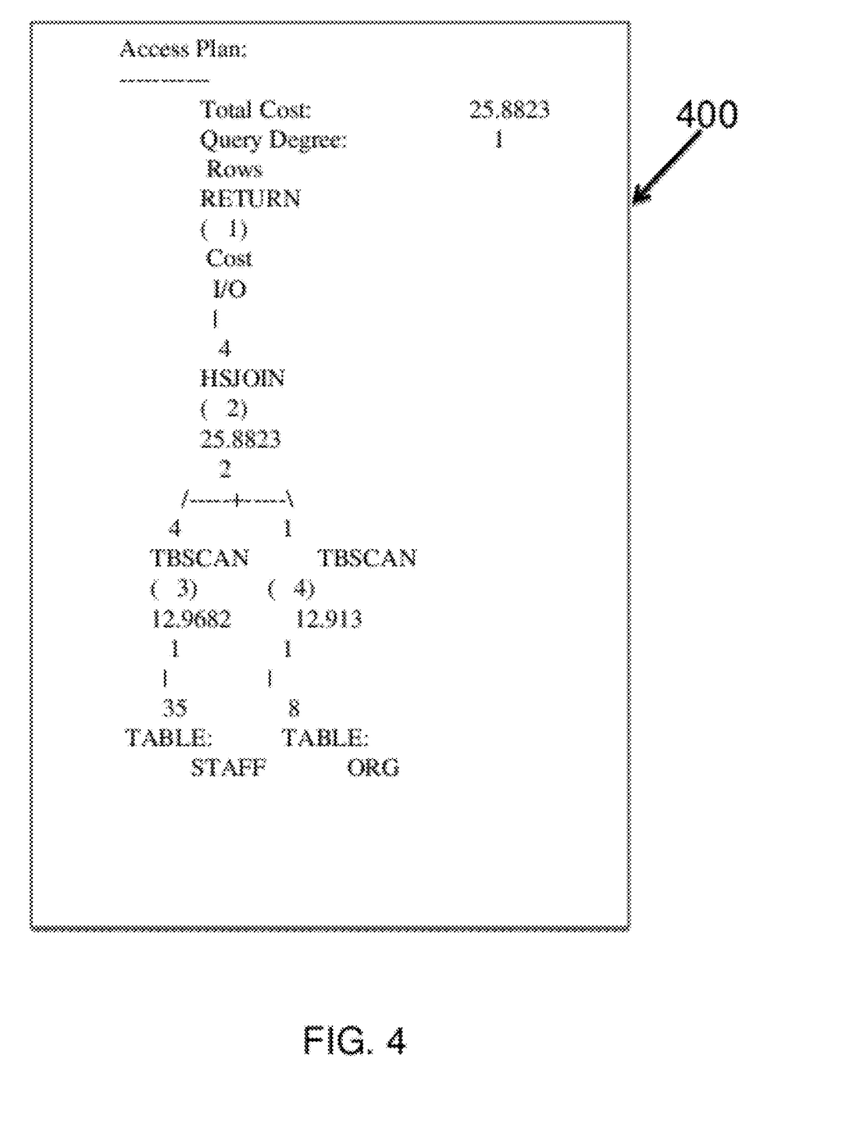
FIG. 4 shows an access plan in accordance with aspects of the invention.

These statistics can then be used to decipher the READ to WRITE ratio of each of the disks in the array. To determine SEQUENTIAL/RANDOM nature of I/O it is contemplated to look at an access plan in the database, e.g., storage system 22B. As an illustrative non-limiting example, an access plan 400 can include the representation shown in FIG. 4. Non clustered indexes will have RANDOM I/O, and clustered indexes will have a SEQUENTIAL I/O.

At step 305, the controller profiles each of the disks on the array. This profiling may include, for example, the amount of SEQUENTIAL/RANDOM READ/WRITE operations. At step 310, a determination is made as to whether one or more of the disks have failed in the array. If not, then the process reverts back to step 300. However, if there is a failure, then the array controller will make a substitute. For example, using SEQUENTIAL/RANDOM READ/WRITE operations as a basis with SSD and HDD technologies, the present invention will either: automatically rebuild the failed disk from a standby pool by nominating a hot spare SSD if failed HDD disk was involved in READS AND RANDOM ACCESS PATTERNS (step 315a); or automatically rebuild the failed disk from a standby pool by nominating a HDD if failed SDD disk was involved in WRITES AND SEQUENTIAL ACCESS PATTERNS (step 315b). The process then reverts back to step 300.

In embodiments, when there are an equal amount of READS AND RANDOM ACCESS PATTERN WRITES AND SEQUENTIAL ACCESS PATTERNS, other criteria can be used to weight the selection. For example, power efficiency and/or cooling and/or heating requirements and/or cost of each of the storage technologies can be taken into account to decide which type of storage technology should be used as a substitute. For example, referring to Table 1, above, HDD can be selected over SSD due to its lower cost. Of course, this is only an example, and other criteria as noted in Table 1 can be taken into account when deciding the most appropriate substitute.

FIG. 5 shows another embodiment in accordance with aspects of the present invention. In particular, at step 500, the array controller determines each of the different storage technologies (disks) within the array. At step 505, the array controller takes a snapshot of activity on each of the disks in the array. At step 510, the array controller profiles the activity on a storage system such as, for example, the storage system 22B. At step 515, the array controller monitors the array and determines whether a failure has occurred on one or more of the disks in the array. If no failure has occurred, the system reverts back to step 500. If a failure has occurred, the array controller 520 determines the most efficient disk substitute for the failed disk based on a selected criteria. This may be accomplished by looking at many different criteria of the failed disk including disk operations, heating and cooling requirements, power requirements, etc. Once a desired criteria is selected, the array controller will select a substitute disk from a pool of disks from a look up table, at step 525. At step 530, the failed disk is replaced with the substitute disk. Again, any of the criteria can be weighted more than another. For example, power efficiency can have a weighting more than the cost factor of the disk.

In another example, the array controller provides a data redundancy scheme such as RAID, where data files and related parity are striped across the multiple disks. Disk arrays, in particular RAID-3 and RAID-5 disk arrays, represent accepted designs for highly available and reliable disk subsystems. In such arrays, the exclusive-OR of data from some number of disks is maintained on a redundant disk (the parity drive). When a disk fails, the data on it can be reconstructed by exclusive-ORing the data on the surviving disks and writing this data into a spare disk.

More specifically, in FIG. 6, at step 600, to update a small portion of data in a RAID-5 system, for example, the array controller first reads old data in that location and reads the corresponding old parity from the corresponding parity drive. At step 605, a substitute disk is selected based on the I/O characteristics and/or other factors noted above, with or without weightings. At step 610, the array controller XORs (exclusive ORs) the data with the new data to generate the new parity, after which the array controller can write the new data to the data drive and the new parity to the parity drive at step 615. In this way, the array controller performs a read-modify-write of the data drive and the parity drive. Each read of the data drive or the parity drive requires movement of a disk arm to the data being read, which is referred to as a "seek". In systems with two or more parity drives, for example a RAID-6 system, one seek is required for each parity drive to read parity data during the write process.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

Illustrative Industrial Applicability

Taking a pragmatic example, a mission critical 24*7 production system is running over a database configured to reside over any storage comprising hybrid array of disk drives (e.g., a mix of HDD and SSD). In such scenario, current databases are not designed to optimally rebuild a failed disk with realization of the underlying disk technology in order to reap its benefits. (RAID rebuilding algorithms do not consider advantages of the underlying disk technology and the type of access (sequential vs random) while rebuilding a failed disk.) However, in implementing the present situation, the systems and methods will take into consideration the underlying disk technology and the type of access (SEQUENTIAL vs. RANDOM) while rebuilding a failed disk.

Current rebuilding mechanisms are problematic because during a RAID rebuild the performance of the RAID array is degraded, especially as utilization of the RAID array increases, and the impact becomes greater and greater. This performance degradation is very noticeable in transaction intensive environments where entire array stripes across all disks are accessed as compared to individual data blocks. In these types of systems it is possible to keep the array 100% utilized for long periods of time; however, a failed disk will negatively impact such performance. Thus any rebuilding of the array greatly impacts the performance of the system because the system's stripping methods results in the system running only as fast as the slowest array. As storage subsystems continue to increase to multi peta-byte levels, the likelihood that at any given time an array is in a degraded state starts to approach 100%. However, by implementing the systems and methods of the present invention, the most efficient disk will be used as a substitute for a failed disk, thus increasing the performance of the array, and such substitution allows for a rebuilding process to be performed with a majority of the ongoing I/O requests running at full speed.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principals of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed is:

1. A method implemented in a computer infrastructure having computer executable code tangibly embodied on a computer readable storage medium having programming instructions operable to:
  determine input/output (I/O) characteristics of one or more disks in an array;
  monitor the one or more disks in the array to determine when any of the one or more of the disks have failed in the array; and
  automatically rebuild the failed disk from a standby pool by nominating a disk in the standby pool based on the I/O characteristics of the one or more failed disks prior to failure, wherein the I/O characteristics are READ and ACCESS operations in RANDOM and SEQUENTIAL operations.

2. The method of claim 1, wherein the determining the I/O characteristics is provided by polling each of the one or more disks of the array.

3. The method of claim 1, wherein the determining the I/O characteristics are provided as statistics used to decipher READ to WRITE ratio of each of the one or more failed disks.

4. The method of claim 1, wherein the nominating disk is selected by using a look up table showing efficiencies of different types of disks based on the I/O characteristics of the failed disk.

5. The method of claim 4, wherein the determining the I/O characteristics is provided by polling each of the one or more disks of the array.

6. The method of claim 5, wherein the determining the I/O characteristics are provided as statistics used to decipher READ to WRITE ratio of each of the one or more failed disks.

7. The method of claim 6, wherein the rebuilding operation is performed with ongoing I/O requests running at full speed.

8. The method of claim 4, wherein the nominating disk is selected based on efficiency of READ and ACCESS operations.

9. The method of claim 4, wherein the nominating disk is selected is a different type of storage device than the failed disk.

10. The method of claim 1, wherein an array controller selects a substitute disk that most efficiently processes the I/O characteristics previously performed on the failed disk of the array.

11. The method of claim 1, further comprising using factors when making a substitute for the failed disk including at least one of costs, heating and cooling requirements, size of the available substitute disks, rate of failures, and power efficiency.

12. The method of claim 11, wherein the factors are weighted.

13. The method of claim 1, wherein the I/O characteristics are weighted.

14. The method of claim 1, wherein the rebuilding operation is performed with ongoing I/O requests running at full speed.

15. The method of claim 1, wherein a service provider at least one of creates, maintains, deploys and supports the computer infrastructure.

16. The method of claim 1, wherein steps of claim 1 are provided by a service provider on a subscription, advertising, and/or fee basis.

17. A system implemented in hardware, comprising an array controller operable to determine characteristics of one or more failed disks in an array and automatically rebuilding the one or more failed disk from a standby pool by selecting a substitute disk from the standby pool based on the characteristics of the one or more failed disks prior to failure, and wherein the rebuilding is performed with ongoing I/O requests running at full speed.

18. The system of claim 17, wherein the array controller includes a rebuild manager which is communicatively coupled to the array controller for use in the rebuilding.

19. The system of claim 17, wherein the I/O characteristics are provided as statistics used to decipher READ to WRITE ratio of each of the one or more failed disks.

20. The system of claim 17, wherein the array controller determines SEQUENTIAL/RANDOM READ/WRITE operations of the one or more failed disks, prior to failure, and substitutes the one or more failed disks with the substitute disk that is designed to most efficiently perform the determined SEQUENTIAL/RANDOM READ/WRITE operations of the failed one or more disk, amongst a pool of disks.

21. The system of claim 17, wherein the array controller accesses a look up table to select the substitute disk designed to most efficiently perform the SEQUENTIAL/RANDOM READ/WRITE operations of the failed one or more disk, amongst a pool of disks.

22. The system of claim 17, wherein the array controller weights the characteristics of the one or more failed disks, prior to making the determination of which substitute disk in the standby pool to use.

23. The system of claim 22, wherein the characteristics include factors of at least one of costs of the nominated disk, heating and cooling requirements, storage capacity, statistical rate of failures and power efficiency.

24. The system of claim 22, wherein the I/O characteristics are weighted.

25. A computer program product comprising a computer usable storage medium included within a hardware system having readable program code embodied in the storage medium, the computer program product includes at least one component operable to:
   monitor one or more disks in an array to determine a failure of any of the one or more of the disks; and
   automatically substitute the failed disk using a substitute disk from a pool of substitute disks varying technologies, based on matching of I/O characteristics of the one or more failed disks prior to failure,
   wherein the I/O characteristics are READ and ACCESS operations in RANDOM and SEQUENTIAL operations.

26. A computer system for substituting a failed disk, the system comprising:
   a CPU, a computer readable memory and a computer readable storage media;
   first program instructions to determine I/O characteristics of one or more disks in an array by polling each of the one or more disks of the array, wherein the I/O characteristics are READ and ACCESS operations in RANDOM and SEQUENTIAL operations provided as statistics used to decipher READ to WRITE ratio of each of the one or more failed disks in the array,
   second program instructions to monitor the one or more disks in the array to determine when any of the one or more of the disks have failed in the array;
   third program instructions to nominate a disk from a pool of disks using a look up table showing efficiencies of different technologies based on the I/O characteristics of one or more failed disks in the array;
   fourth program instructions to automatically rebuild the failed disk by substituting the failed disk with a substitute disk selected from the pool of disks, based on the I/O characteristics of the one or more failed disks prior to failure, the rebuilding being performed with ongoing I/O requests running at full speed; and
   fifth program instructions to the I/O characteristics are weighted, wherein
   the first, second, third, fourth and fifth program instructions are stored on the computer readable storage media for execution by the CPU via the computer readable memory.

27. A method of deploying a system for substituting failed disks in an array comprising:
   providing a computer infrastructure, being operable to:
   monitor one or more disks in an array to determine a failure of any of the one or more of the disks; and automatically substitute the failed disk using a substitute disk from a pool of substitute disks varying technologies, based on matching of I/O characteristics of the one or more failed disks prior to failure, wherein the I/O characteristics are READ and ACCESS operations in RANDOM and SEQUENTIAL operations.

28. The method of claim 27, wherein:

the I/O characteristics are READ and ACCESS operations in RANDOM and SEQUENTIAL operations provided as statistics in order to decipher READ to WRITE ratio of each of the one or more disks in the array, the I/O characteristics are provided by polling each of the one or more disks of the array.

29. The method of claim 28, wherein the I/O characteristics are weighted.

30. The method of claim 29, wherein the substitute disk is different from the failed disk, and is provided by selected substitute disk technology in a look up table showing efficiencies of different types of disks based on the I/O characteristics of the failed disk.

\* \* \* \* \*